W. JOHNSON.
Bung-Bushing.
No. 219,099.  Patented Sept. 2, 1879.
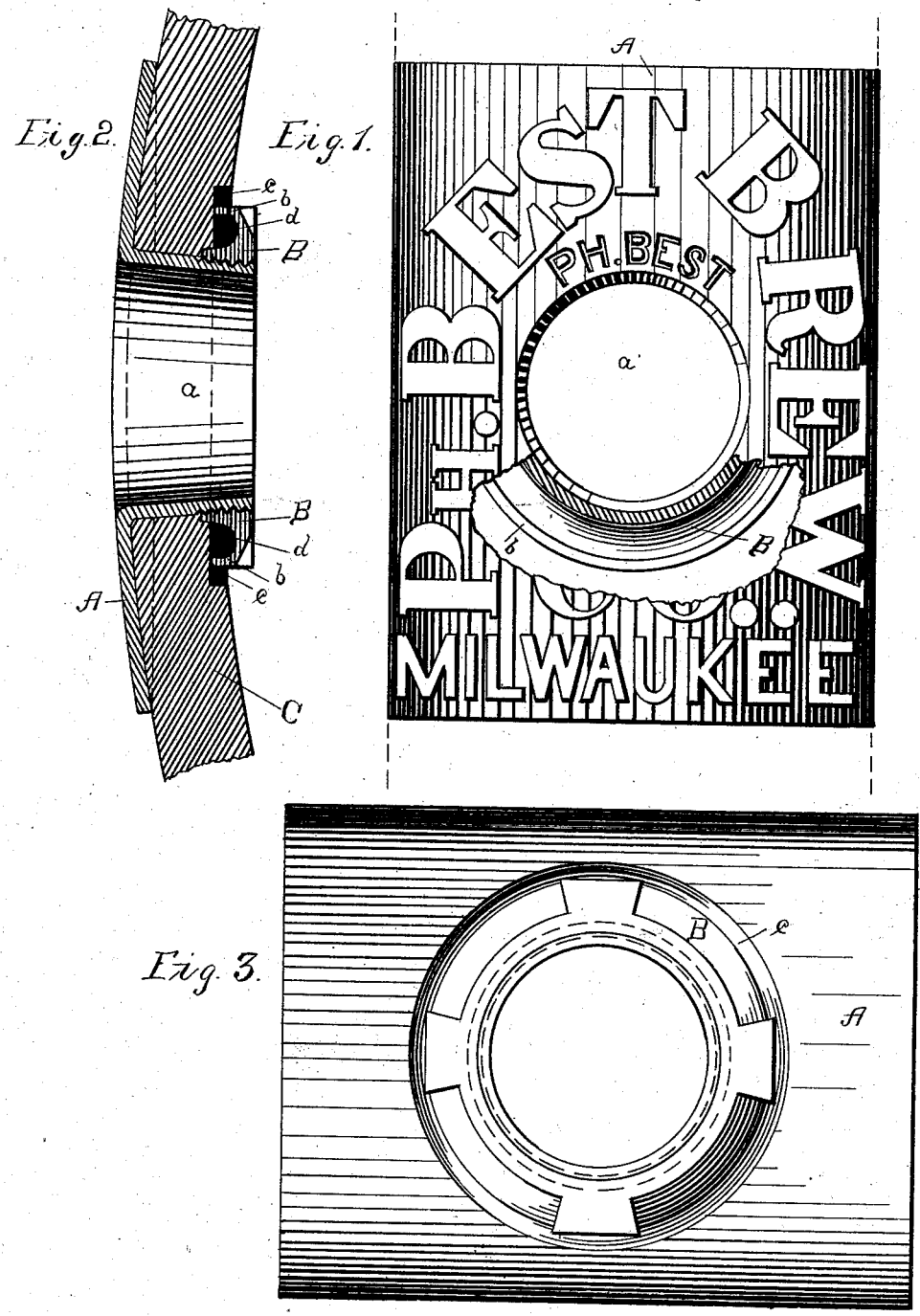
WITNESSES.
Isabel N. Dana.
Edwin G. Asmus.
INVENTOR.
Wm Johnson
per S. S. Smit
Attorney

UNITED STATES PATENT OFFICE.

WILLIAM JOHNSON, OF MILWAUKEE, WISCONSIN.

IMPROVEMENT IN BUNG-BUSHINGS.

Specification forming part of Letters Patent No. 219,099, dated September 2, 1879; application filed June 25, 1879.

*To all whom it may concern:*

Be it known that I, WILLIAM JOHNSON, of Milwaukee, in the county of Milwaukee, and in the State of Wisconsin, have invented a new and useful Improvement in Bung-Bushings for Casks, Barrels, &c.; and do hereby declare that the following is a full, clear, and exact description thereof, reference being had to the accompanying drawings, making part of this specification, in which—

Figure 1 represents a top or plan view of the bung-bush with a portion broken away; Fig. 2, a section through the center in the direction of the length of the stave, and Fig. 3 a bottom view.

The liability of beer-casks to leak and permit the escape of gas about the bung-hole has been a source of serious difficulty to brewers and others handling beer.

The object of my invention is to overcome this; and to this end it consists in a bushing to fit in the bung-hole, and screw-threaded on its lower end to receive a nut of peculiar construction, and also in the features of construction, as will hereinafter be more fully described.

A is the bushing, the lower end of which is screw-threaded externally to receive a nut, B. This nut has a grooved flange, $b$, the purpose of which will be hereinafter explained.

The bushing A is to be fitted to a stave, C, in the usual manner, the socket extending down into the stave and beyond its inner face far enough to take the nut B. The stave is mortised out around the bung-hole on the inside for about half an inch, so that when the nut is screwed into place there will be a margin around it about an eighth of an inch wide.

After the bushing has been put upon the stave the groove in the flange $b$ of the nut is filled with pitch or other sealing substance, $d$, and the nut is screwed upon the socket until the edge of its flange fits tight upon the inner face of the stave. The stave is then put into a cask, which, after being hooped and headed in the usual manner, is ready for pitching. This is accomplished in the usual manner, the heat being supplied by a hot-air pipe introduced through the bung-hole.

As the metal of the bushing is warmed it melts the pitch in the flange $b$, whereupon enough of it percolates into the interstices between the bushing and the stave as may be necessary, where, upon the cooling of the cask, it hardens, making the cask at that point perfectly gas and water tight, the remainder settling back in the groove to harden until the pitching operation is again gone through with, when it will be remelted, and will seal up the openings and leaks made by the charring of the wood about the bung and the loosening thereof consequent upon the frequent removal, replacement, and tightening of the bung.

Casks in constant use are usually pitched four times a year.

After my bushing has been put on a cask it will not be necessary to remove it, as the supply of pitch in the flange will be sufficient to reseal it as long as it lasts; and as there is a groove, $c$, all around the flange in the stave, this will fill with pitch, so that all possibility of leakage will be avoided.

I am aware that an externally-threaded bushing has been employed in conjunction with an internally-threaded cap, and also that an internally-threaded bushing has been used in conjunction with an externally-threaded tap or plug for the purpose of closing the bung or an opening in a can or barrel; and, furthermore, that both cap and plug have been provided with a grooved flange, so formed in order to obtain an annular ridge or edge to engage with a gasket in order to form a tight joint; but in such instances the bushing was not secured or held in position by the cap or plug alone; neither were such devices adapted to be used as a bushing for a barrel. I therefore distinctly disclaim such devices.

I claim as my invention—

1. A bung-bushing threaded externally at one extremity and provided with an annular nut having a grooved flange for securing and sealing the bushing, substantially as specified.

2. The combination, with a barrel-stave having a depression or mortise around the bung-hole for the reception of a liquefiable sealing substance, of an externally-threaded bushing and an annular nut having a grooved flange adapted to receive and retain a liquefiable sealing substance, substantially as and for the purpose specified.

3. The combination, with a stave, of a bushing and nut for securing the same, the latter having a channel or groove for the reception of a liquefiable sealing substance, and a liquefiable sealing substance interposed between the grooved nut and stave, substantially as and for the purpose specified.

In testimony that I claim the foregoing I have hereunto set my hand this 19th day of June, 1879.

WM. JOHNSON.

Witnesses:
  E. H. BOTTUM,
  S. S. STOUT.